(12) United States Patent
Giladi

(10) Patent No.: US 12,478,793 B2
(45) Date of Patent: Nov. 25, 2025

(54) REDUCING ELECTROSENSATION WHILST TREATING A SUBJECT USING ALTERNATING ELECTRIC FIELDS BY PAIRING TRANSDUCER ARRAYS TOGETHER

(71) Applicant: Novocure GmbH, Root (CH)

(72) Inventor: Moshe Giladi, Haifa (IL)

(73) Assignee: Novocure GmbH, Baar (CH)

( * ) Notice: Subject to any disclaimer, the term of this patent is extended or adjusted under 35 U.S.C. 154(b) by 376 days.

(21) Appl. No.: 18/128,644

(22) Filed: Mar. 30, 2023

(65) Prior Publication Data

US 2023/0310877 A1 Oct. 5, 2023

Related U.S. Application Data

(60) Provisional application No. 63/325,438, filed on Mar. 30, 2022.

(51) Int. Cl.
*A61N 1/40* (2006.01)
*A61N 1/04* (2006.01)
*A61N 1/30* (2006.01)
*A61N 1/36* (2006.01)

(52) U.S. Cl.
CPC ............. *A61N 1/40* (2013.01); *A61N 1/0476* (2013.01); *A61N 1/30* (2013.01); *A61N 1/36002* (2017.08); *A61N 1/36034* (2017.08)

(58) Field of Classification Search
None
See application file for complete search history.

(56) References Cited

U.S. PATENT DOCUMENTS

| | | |
|---|---|---|
| 6,868,289 B2 | 3/2005 | Palti |
| 7,016,725 B2 | 3/2006 | Palti |
| 7,089,054 B2 | 8/2006 | Palti |
| 7,136,699 B2 | 11/2006 | Palti |
| 7,333,852 B2 | 2/2008 | Palti |
| 7,467,011 B2 | 12/2008 | Palti |
| 7,519,420 B2 | 4/2009 | Palti |
| 7,565,205 B2 | 7/2009 | Palti |
| 7,565,206 B2 | 7/2009 | Palti |
| 7,599,745 B2 | 10/2009 | Palti |
| 7,599,746 B2 | 10/2009 | Palti |
| 7,706,890 B2 | 4/2010 | Palti |
| 7,715,921 B2 | 5/2010 | Palti |

(Continued)

OTHER PUBLICATIONS

International Search Report and Written Opinion issued in application No. PCT/IB2023/053208 dated Jun. 23, 2023.

*Primary Examiner* — Michael W Kahelin
(74) *Attorney, Agent, or Firm* — Potomac Law Group, PLLC

(57) ABSTRACT

When treating a subject using alternating electric fields (e.g., using TTFields to treat a tumor, or using alternating electric fields to increase the permeability of the blood brain barrier), some subjects experience an unpleasant electrosensation effect. This electrosensation can be reduced or eliminated by increasing the area of the transducer arrays that is active during certain times in the treatment. In some embodiments, this is accomplished by applying an AC signal between two pairs of transducer arrays at certain times (as opposed to the prior art approach of applying an AC signal between two individual transducer arrays).

5 Claims, 7 Drawing Sheets

(56) References Cited

U.S. PATENT DOCUMENTS

| | | |
|---|---|---|
| 7,805,201 B2 | 9/2010 | Palti |
| 7,890,183 B2 | 2/2011 | Palti et al. |
| 7,912,540 B2 | 3/2011 | Palti |
| 7,917,227 B2 | 3/2011 | Palti |
| 8,019,414 B2 | 9/2011 | Palti |
| 8,027,738 B2 | 9/2011 | Palti |
| 8,170,684 B2 | 5/2012 | Palti |
| 8,175,698 B2 | 5/2012 | Palti et al. |
| 8,229,555 B2 | 7/2012 | Palti |
| RE43,618 E | 8/2012 | Palti |
| 8,244,345 B2 | 8/2012 | Palti |
| 8,406,870 B2 | 3/2013 | Palti |
| 8,447,395 B2 | 5/2013 | Palti et al. |
| 8,447,396 B2 | 5/2013 | Palti et al. |
| 8,465,533 B2 | 6/2013 | Palti |
| 8,706,261 B2 | 4/2014 | Palti |
| 8,715,203 B2 | 5/2014 | Paiti |
| 8,718,756 B2 | 5/2014 | Palti |
| 8,764,675 B2 | 7/2014 | Palti |
| 9,023,090 B2 | 5/2015 | Palti |
| 9,023,091 B2 | 5/2015 | Palti |
| 9,039,674 B2 | 5/2015 | Palti et al. |
| 9,056,203 B2 | 6/2015 | Palti et al. |
| 9,440,068 B2 | 9/2016 | Palti et al. |
| 9,655,669 B2 | 5/2017 | Palti et al. |
| 9,750,934 B2 | 9/2017 | Palti et al. |
| 9,910,453 B2 | 3/2018 | Wasserman et al. |
| 10,188,851 B2 | 1/2019 | Wenger et al. |
| 10,441,776 B2 | 10/2019 | Kirson et al. |
| 10,779,875 B2 | 9/2020 | Palti et al. |
| 10,967,167 B2 | 4/2021 | Hagemann et al. |
| 11,103,698 B2 | 8/2021 | Chang et al. |
| 11,191,956 B2 | 12/2021 | Giladi et al. |
| 2004/0176804 A1 | 9/2004 | Palti |
| 2006/0167499 A1 | 7/2006 | Palti |
| 2006/0276858 A1 | 12/2006 | Palti |
| 2007/0225766 A1 | 9/2007 | Palti |
| 2007/0239213 A1 | 10/2007 | Palti |
| 2009/0076366 A1 | 3/2009 | Palti |
| 2012/0029419 A1 | 2/2012 | Palti |
| 2012/0283726 A1 | 11/2012 | Palti |
| 2014/0330268 A1 | 11/2014 | Palti et al. |
| 2017/0120041 A1 | 5/2017 | Wenger et al. |
| 2017/0215939 A1 | 8/2017 | Palti et al. |
| 2017/0281934 A1 | 10/2017 | Gliadi et al. |
| 2018/0001075 A1 | 1/2018 | Kirson et al. |
| 2018/0008708 A1 | 1/2018 | Giladi et al. |
| 2018/0050200 A1 | 2/2018 | Wasserman et al. |
| 2018/0160933 A1 | 6/2018 | Urman et al. |
| 2018/0202991 A1 | 7/2018 | Giladi et al. |
| 2018/0280687 A1 | 10/2018 | Carter et al. |
| 2019/0117956 A1 | 4/2019 | Wenger et al. |
| 2019/0117963 A1 | 4/2019 | Travers et al. |
| 2019/0224474 A1 | 7/2019 | Yang et al. |
| 2019/0308016 A1 | 10/2019 | Wenger et al. |
| 2020/0001069 A1 | 1/2020 | Kirson et al. |
| 2020/0009376 A1 | 1/2020 | Chang et al. |
| 2020/0009377 A1* | 1/2020 | Chang .................. A61N 1/025 |
| 2020/0016067 A1 | 1/2020 | Gotlib et al. |
| 2020/0023179 A1 | 1/2020 | Bomzon et al. |
| 2020/0061360 A1 | 2/2020 | Hagemann et al. |
| 2020/0061361 A1 | 2/2020 | Hagemann et al. |
| 2020/0069937 A1 | 3/2020 | Naveh et al. |
| 2020/0078582 A1 | 3/2020 | Alon et al. |
| 2020/0108031 A1 | 4/2020 | Borst et al. |
| 2020/0114141 A1 | 4/2020 | Bomzon et al. |
| 2020/0114142 A1 | 4/2020 | Bomzon et al. |
| 2020/0121728 A1 | 4/2020 | Wardak et al. |
| 2020/0129761 A1 | 4/2020 | Bomzon et al. |
| 2020/0146586 A1 | 5/2020 | Naveh et al. |
| 2020/0155835 A1 | 5/2020 | Wasserman et al. |
| 2020/0171297 A1 | 6/2020 | Kirson et al. |
| 2020/0179512 A1 | 6/2020 | Giladi et al. |
| 2020/0219261 A1 | 7/2020 | Shamir et al. |
| 2020/0269037 A1 | 8/2020 | Hagemann et al. |
| 2020/0269041 A1 | 8/2020 | Zeevi et al. |
| 2020/0269042 A1 | 8/2020 | Giladi et al. |
| 2020/0368525 A1 | 11/2020 | Maag et al. |
| 2021/0031031 A1 | 2/2021 | Wasserman et al. |
| 2021/0038584 A1 | 2/2021 | Voloshin-Sela |
| 2021/0060334 A1 | 3/2021 | Avraham et al. |
| 2021/0069503 A1 | 3/2021 | Tran et al. |
| 2021/0138233 A1 | 5/2021 | Deslauriers |
| 2021/0162228 A1 | 6/2021 | Urman et al. |
| 2021/0177492 A1 | 6/2021 | Travers et al. |
| 2021/0187277 A1 | 6/2021 | Wasserman et al. |
| 2021/0196348 A1 | 7/2021 | Wasserman |
| 2021/0199640 A1 | 7/2021 | Patel et al. |
| 2021/0203250 A1 | 7/2021 | Wasserman |
| 2021/0268247 A1 | 9/2021 | Story et al. |
| 2021/0299440 A1 | 9/2021 | Deslauriers et al. |
| 2021/0308446 A1 | 10/2021 | Alon et al. |
| 2021/0330950 A1 | 10/2021 | Hagemann et al. |
| 2021/0346694 A1 | 11/2021 | Wasserman et al. |
| 2021/0379362 A1 | 12/2021 | Smith et al. |
| 2021/0408383 A1 | 12/2021 | Kalra et al. |
| 2022/0095997 A1 | 3/2022 | Wasserman |
| 2022/0096821 A1 | 3/2022 | Kirson et al. |
| 2022/0118249 A1 | 4/2022 | Bomzon et al. |
| 2022/0161028 A1 | 5/2022 | Gliadi et al. |
| 2022/0193435 A1 | 6/2022 | Wasserman et al. |
| 2022/0267445 A1 | 8/2022 | Tran et al. |
| 2022/0280787 A1 | 9/2022 | Bomzon et al. |
| 2022/0288395 A1 | 9/2022 | Voloshin-Sela et al. |
| 2022/0313992 A1 | 10/2022 | Wasserman |
| 2022/0323753 A1 | 10/2022 | Voloshin-Sela et al. |
| 2022/0387784 A1 | 12/2022 | Kirson et al. |
| 2022/0395699 A1 | 12/2022 | Doyle |
| 2022/0409893 A1 | 12/2022 | Wasserman et al. |
| 2023/0000384 A1 | 1/2023 | Wasserman et al. |
| 2023/0001197 A1 | 1/2023 | Wasserman et al. |
| 2023/0001221 A1 | 1/2023 | Farber |
| 2023/0009366 A1 | 1/2023 | Voloshin-Sela et al. |
| 2023/0019638 A1 | 1/2023 | Wasserman |
| 2023/0037806 A1 | 2/2023 | Wasserman et al. |
| 2023/0043071 A1 | 2/2023 | Wasserman et al. |
| 2023/0098801 A1 | 3/2023 | Carlson |
| 2023/0141087 A1 | 5/2023 | Giladi et al. |
| 2023/0188055 A1 | 6/2023 | Wasserman |

* cited by examiner

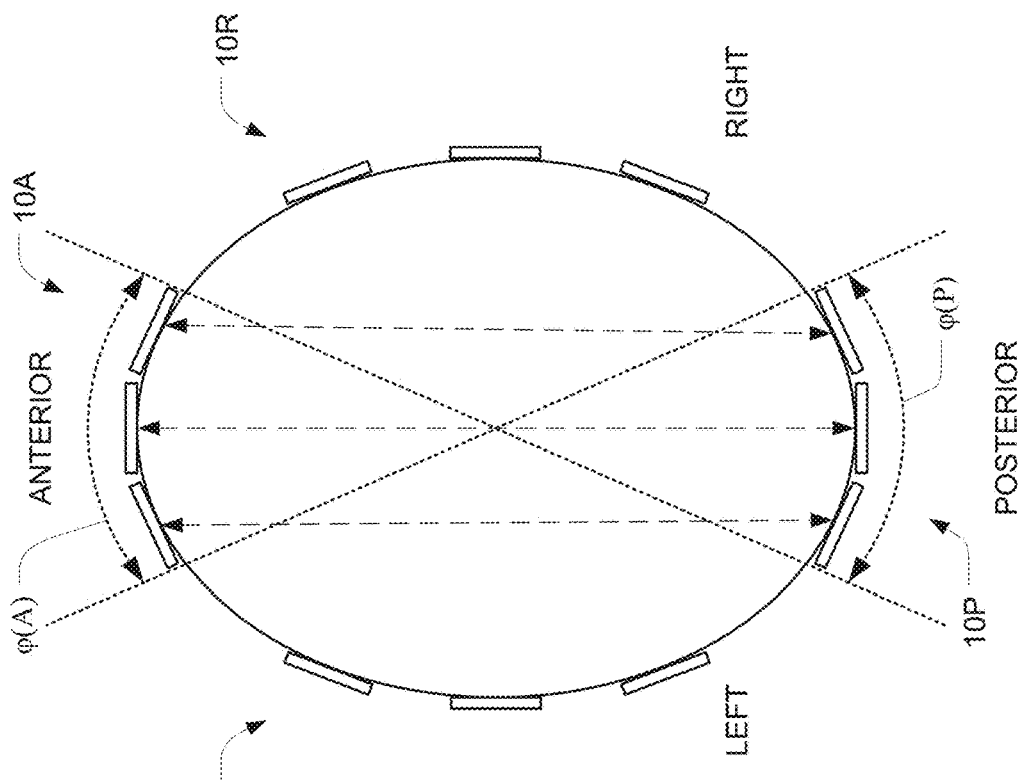
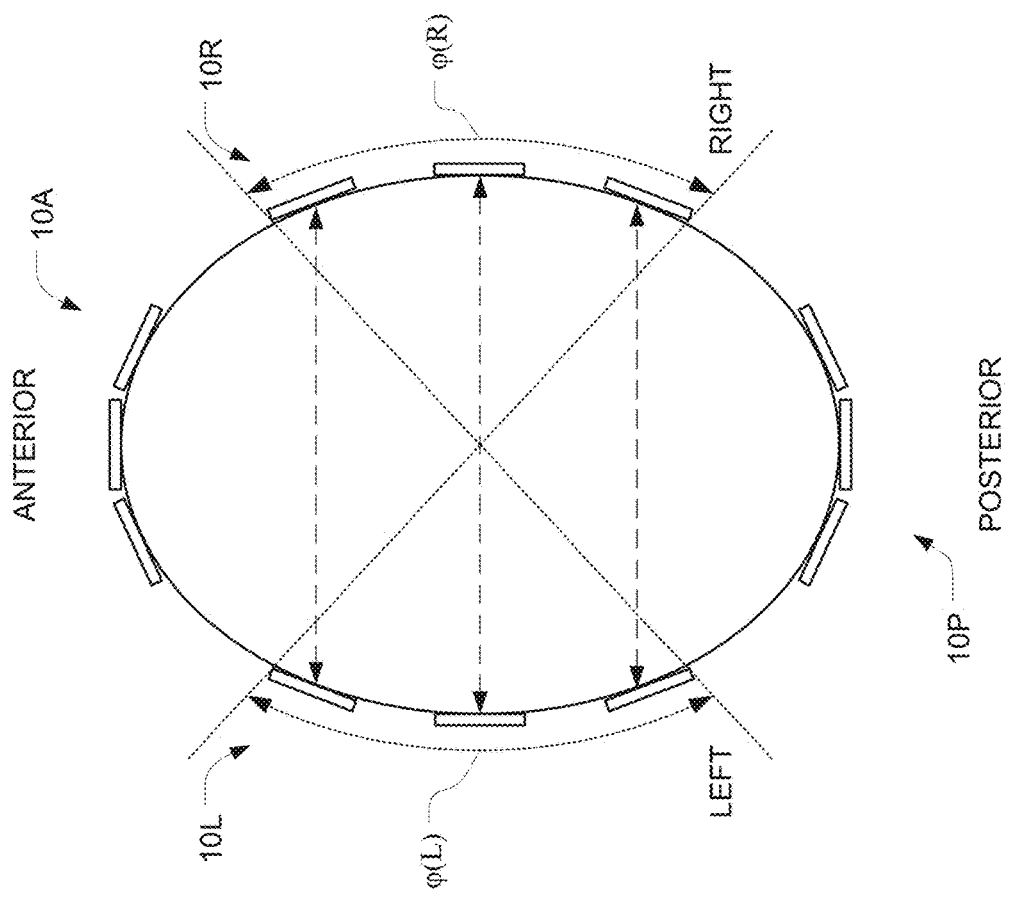
FIG. 3A
FIG. 3B

REDUCING ELECTROSENSATION WHILST TREATING A SUBJECT USING ALTERNATING ELECTRIC FIELDS BY PAIRING TRANSDUCER ARRAYS TOGETHER

CROSS REFERENCE TO RELATED APPLICATIONS

This application claims the benefit of U.S. Provisional Application 63/325,438, filed Mar. 30, 2022, which is incorporated herein by reference in its entirety.

BACKGROUND

Tumor Treating Fields, or TTFields, are alternating electric fields within the intermediate frequency range (e.g., 100-500 kHz) that inhibit cancer cell growth. This non-invasive treatment targets solid tumors and is described in U.S. Pat. No. 7,565,205, which is incorporated herein by reference in its entirety. 200 kHz TTFields are FDA approved for the treatment of glioblastoma (GBM), and may be delivered, for example, via the prior art Optune® system, which is depicted schematically in FIG. 1. The TTFields are delivered to patients via four transducer arrays 10 (i.e., electrode arrays) that are placed on the patient's skin in close proximity to a tumor. Each transducer array 10 includes a plurality (e.g., between 9 and 20) capacitively coupled electrode elements, each of which has an electrically conductive substrate with a dielectric layer disposed thereon.

Alternating electric fields at frequencies between 50 kHz and 1 MHz can also be used to treat medical conditions other than tumors. For example, as described in U.S. Pat. No. 10,967,167 (which is incorporated herein by reference in its entirety), alternating electric fields e.g., at 50-200 kHz can increase the permeability of the blood brain barrier (BBB) so that, e.g., chemotherapy drugs can reach the brain. And as described in U.S. Pat. No. 11,103,698 (which is incorporated herein by reference in its entirety), alternating electric fields e.g., at 50-500 kHz can increase the permeability of cell membranes so that large molecules can traverse cell membranes.

When Optune® is used to treat glioblastoma, one pair of arrays (10L, 10R) is positioned to the left and right of the tumor, and the other pair of arrays (10A, 10P) is positioned anterior and posterior to the tumor. The Optune® signal generator 95 (a) applies an AC voltage between arrays 10L, 10R for 1 second, which induces an electric field in one direction through the tumor; then (b) applies an AC voltage between the arrays 10A, 10P for 1 second, which induces an electric field in another direction through the tumor; then repeats that two-step sequence (a) and (b) for the duration of the treatment.

SUMMARY OF THE INVENTION

One aspect of this application is directed to a first method for treating a tumor in a target region and delivering a substance across a biological barrier in the target. The first method comprises applying an alternating voltage at a first frequency between a first set of one or more electrode elements positioned at a first side of the target region and a second set of one or more electrode elements positioned at a second side of the target region, wherein the first side and the second side are on opposite sides of the target region. The first method also comprises applying an alternating voltage at a second frequency between a third set of one or more electrode elements positioned at a third side of the target region and a fourth set of one or more electrode elements positioned at a fourth side of the target region, wherein the third side and the fourth sides are on opposite sides of the target region, wherein the third side is disposed circumferentially between the first side and the second side, and wherein the fourth side is disposed circumferentially between the first side and the second side. And the first method also comprises applying an alternating voltage at a third frequency between (i) both the first and third sets of one or more electrode elements and (ii) both the second and fourth sets of one or more electrode elements, wherein the third frequency is lower than the first frequency and the third frequency is lower than the second frequency. The alternating voltage at the first frequency, the alternating voltage at the second frequency, and the alternating voltage at the third frequency are each applied during different intervals of time.

Some instances of the first method further comprise positioning the first set of one or more electrode elements at the first side of the target region; positioning the second set of one or more electrode elements at the second side of the target region; positioning the third set of one or more electrode elements at the third side of the target region; and positioning the fourth set of one or more electrode elements at the fourth side of the target region.

In some instances of the first method, the first frequency is selected so that an electric field that is induced in the target region due to application of the alternating voltage at the first frequency between the first set of one or more electrode elements and the second set of one or more electrode elements will have an anti-mitotic effect. The second frequency is selected so that an electric field that is induced in the target region due to application of the alternating voltage at the second frequency between the third set of one or more electrode elements and the fourth set of one or more electrode elements will have an anti-mitotic effect. And the third frequency is selected so that an electric field that is induced in the target region due to application of the alternating voltage at the third frequency between (a) both the first and third sets of one or more electrode elements and (b) both the second and fourth sets of one or more electrode elements will increase permeability of the biological barrier in the target region. Optionally, in these instances, the first frequency and the second frequency may be the same.

In some instances of the first method, the first and second frequencies are each between 50 kHz and 1 MHz, and the third frequency is between 50 kHz and 300 kHz. In some instances of the first method, the alternating voltage at the third frequency is applied for at least 24 hours.

In some instances of the first method, the steps of (a) applying the alternating voltage at the first frequency between the first set of one or more electrode elements and the second set of one or more electrode elements and (b) applying the alternating voltage at the second frequency between the third set of one or more electrode elements and the fourth set of one or more electrode elements are repeated in an alternating sequence at least 10,000 times.

Another aspect of this application is directed to a first apparatus for treating a tumor in a target region and promoting delivery of a substance across a biological barrier in the target region. The first apparatus comprises at least one signal generator, a bank of switches, and a controller. The at least one signal generator is configured to generate an alternating voltage at a first frequency and to generate an alternating voltage at a second frequency, wherein the second frequency is lower than the first frequency. The bank of switches has at least one control input, a first output terminal, a second output terminal, a third output terminal, and a fourth output terminal. The bank of switches inputs the alternating voltage at the first frequency, and inputs the alternating voltage at the second frequency. The bank of switches is configured to, in response to a first state of the at least one control input, route the alternating voltage at the first frequency so that the alternating voltage at the first frequency appears between the first output terminal and the second output terminal. The bank of switches is also configured to, in response to a second state of the at least one control input, route the alternating voltage at the first frequency so that the alternating voltage at the first frequency appears between the third output terminal and the fourth output terminal. And the bank of switches is also configured to, in response to a third state of the at least one control input, route the alternating voltage at the second frequency so that the alternating voltage at the second frequency appears between (a) both the first output terminal and the third output terminal and (b) both the second output terminal and the fourth output terminal. The controller is programmed to, at different intervals of times, (i) set the at least one control input to the first state, (ii) set the at least one control input to the second state, and (iii) set the at least one control input to the third state.

In some embodiments of the first apparatus, the first frequency is selected to provide an anti-mitotic effect, and the second frequency is selected to increase a permeability of a biological barrier. In some embodiments of the first apparatus, the first frequency is between 50 kHz and 1 MHz, and the second frequency is between 50 kHz and 300 kHz. In some embodiments of the first apparatus, the controller is programmed to (i) set the at least one control input to the first state and (ii) set the at least one control input to the second state in an alternating sequence at least 10,000 times. In some embodiments of the first apparatus, the controller is programmed to, after repeating (i) and (ii) at least 10,000 times, set the at least one control input to the third state and subsequently leave the at least one control input in the third state for at least 12 hours.

Another aspect of this application is directed to a second method for applying an alternating electric field to a target region in a subject's body using a first set of one or more electrode elements positioned at a first side of the target region, a second set of one or more electrode elements positioned at a second side of the target region, a third set of one or more electrode elements positioned at a third side of the target region, and a fourth set of one or more electrode elements positioned at a fourth side of the target region. The second method comprises (a) applying an alternating voltage at a first frequency between (i) both the first and third sets of one or more electrode elements and (ii) both the second and fourth sets of one or more electrode elements; and (b) applying an alternating voltage at a second frequency between (i) both the first and fourth sets of one or more electrode elements and (ii) both the second and third sets of one or more electrode elements. The first side and the second side are on opposite sides of the target region. The third side and the fourth side are on opposite sides of the target region. The third side is disposed circumferentially between the first side and the second side. And the fourth side is disposed circumferentially between the first side and the second side. Steps (a) and (b) are repeated in an alternating sequence at least ten times.

Some instances of the second method further comprise positioning the first set of one or more electrode elements on or in the subject's body; positioning the second set of one or more electrode elements on or in the subject's body; positioning the third set of one or more electrode elements on or in the subject's body; and positioning the fourth set of one or more electrode elements on or in the subject's body.

In some instances of the second method, the first frequency and the second frequency are each between 50 kHz and 1 MHz. In some instances of the second method, the first frequency and the second frequency are the same.

Another aspect of this application is directed to a second apparatus for applying signals to a set of electrodes. The second apparatus comprises at least one signal generator, a bank of switches, and a controller. The at least one signal generator is configured to generate an alternating voltage. The bank of switches has at least one control input, a first output terminal, a second output terminal, a third output terminal, and a fourth output terminal; and the bank of switches inputs the alternating voltage at the first frequency. The bank of switches is configured to, in response to a first state of the at least one control input, route the alternating voltage so that the alternating voltage appears between (a) both the first output terminal and the third output terminal and (b) both the second output terminal and the fourth output terminal. The bank of switches is also configured to, in response to a second state of the at least one control input, route the alternating voltage so that the alternating voltage appears between (a) both the first output terminal and the fourth output terminal and (b) both the second output terminal and the third output terminal. And the controller is programmed to repeat the following steps in an alternating sequence at least ten times (i) set the at least one control input to the first state, and (ii) set the at least one control input to the second state.

In some embodiments of the second apparatus, the alternating voltage has a frequency between 50 kHz and 1 MHz.

Another aspect of this application is directed to a third method of applying an alternating electric field to a body part of a subject, the body part having a longitudinal axis. The third method comprises applying an alternating voltage between a first set of one or more electrode elements positioned on or in a first side of the body part and a second set of one or more electrode elements positioned on or in a second side of the body part. The first side and the second side are on opposite sides of the longitudinal axis. The first set of one or more electrode elements subtends a first azimuthal angle of at least 120° with respect to the longitudinal axis, within which the coverage by electrode elements is at least one third. And the second set of one or more electrode elements subtends a second azimuthal angle of at least 120° with respect to the longitudinal axis, within which the coverage by electrode elements is at least one third.

In some instances of the third method, the first set of one or more electrode elements is a set of capacitively coupled electrode elements, and the second set of one or more electrode elements is a set of capacitively coupled electrode elements.

In some instances of the third method, the alternating voltage has a frequency of less than 1 MHz. In some instances of the third method, the alternating voltage has a frequency of less than 190 kHz. In some instances of the third method, the alternating voltage is applied for at least 24 hours. In some instances of the third method, the first azimuthal angle is at least 135°, and the second azimuthal angle is at least 135°.

In some instances of the third method, the coverage by the electrode elements within the first azimuthal angle is at least one half, and the coverage by the electrode elements within the second azimuthal angle is at least one half.

In some instances of the third method, the body part is a head, a collective area of the first set of one or more electrode elements is at least 40 cm$^2$, and a collective area of the second set of one or more electrode elements is at least 40 cm$^2$.

Another aspect of this application is directed to a fourth method of applying an alternating electric field to a subject's head, the head having a longitudinal axis and a circumference. The fourth method comprises applying an alternating voltage between a first set of one or more electrode elements positioned on or in a first side of the subject's head and a second set of one or more electrode elements positioned on or in a second side of the subject's head. The first side and the second side are on opposite sides of the longitudinal axis. The first set of one or more electrode elements extends for a first length of at least 15 cm along the circumference, within which the coverage by electrode elements is at least one third. And the second set of one or more electrode elements extends for a second length of at least 15 cm along the circumference, within which the coverage by electrode elements is at least one third.

In some instances of the fourth method, the first set of one or more electrode elements is a set of capacitively coupled electrode elements, and the second set of one or more electrode elements is a set of capacitively coupled electrode elements.

In some instances of the fourth method, the alternating voltage has a frequency of less than 1 MHz. In some instances of the fourth method, the alternating voltage has a frequency of less than 190 kHz. In some instances of the fourth method, the alternating voltage is applied for at least 24 hours.

In some instances of the fourth method, the coverage by the electrode elements within the first length is at least one half, and the coverage by the electrode elements within the second length is at least one half.

In some instances of the fourth method, a collective area of the first set of one or more electrode elements is at least 40 cm$^2$, and a collective area of the second set of one or more electrode elements is at least 40 cm$^2$.

BRIEF DESCRIPTION OF THE DRAWINGS

FIG. 3A is a schematic representation of the electric field that is induced when an AC voltage is applied between the left and right transducer arrays.

FIG. 3B is a schematic representation of the electric field that is induced when an AC voltage is applied between the anterior and posterior transducer arrays.

Various embodiments are described in detail below with reference to the accompanying drawings, wherein like reference numerals represent like elements.

DESCRIPTION OF THE PREFERRED EMBODIMENTS

When treating a subject using alternating electric fields, higher amplitudes are strongly associated with higher efficacy of treatment. However, as the amplitude of the alternating electric field increases, and/or as the frequency of the alternating electric field decreases (e.g., to the vicinity of 100 kHz), some subjects experience an electrosensation effect when the alternating electric field switches direction. This electrosensation could be, for example, a vibratory sensation, paresthesia, and/or a twitching or contraction sensation of muscle fibers. The electrosensation is believed to originate from interactions between the alternating electric fields and nerve cells (i.e., neurons) that are positioned near or adjacent to the transducer arrays. And these sensations may discourage some subjects from continuing their treatment using alternating electric fields.

This application describes a variety of approaches for reducing or eliminating electrosensation while a subject is being treated with alternating electric fields. These approaches rely on increasing the area of the transducer arrays that is active during certain times in the treatment. In some embodiments, this is accomplished by applying an AC signal between two pairs of transducer arrays at certain times (as opposed to the prior art approach of applying an AC signal between two individual transducer arrays).

Assume that an AC current at a given frequency is being coupled through an electrode into a subject's body through a pair of electrodes that are positioned on the subject's skin. When the current density (i.e., the current through any given electrode divided by the area of that electrode) is below a threshold value (which may vary from person to person), electrosensation does not occur. But when the current density rises above that threshold, electrosensation starts to occur, and will become more noticeable when the current density is increased further.

Figure 1:
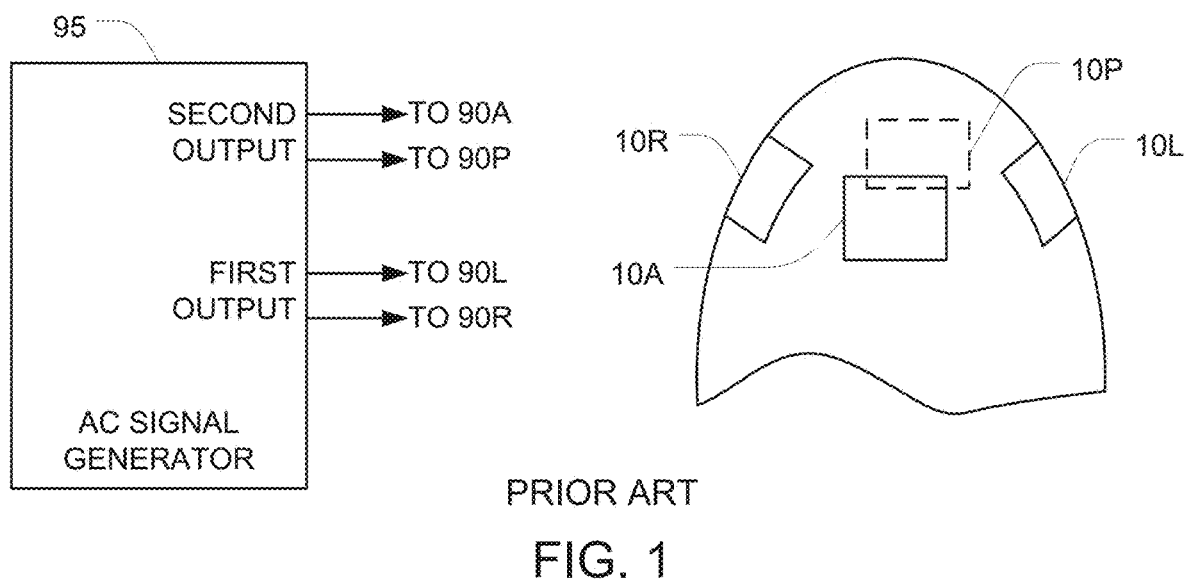
FIG. 1 is a schematic representation of the prior art Optune® system.
Figure 2A:
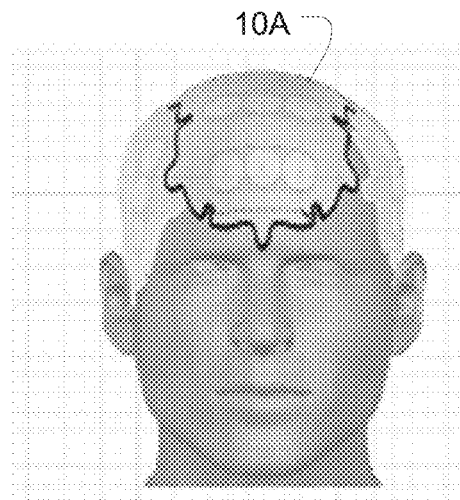
FIGS. 2A-2D depict a set of transducer arrays that are used to apply alternating electric field treatment to a subject's head.
Figure 2B:
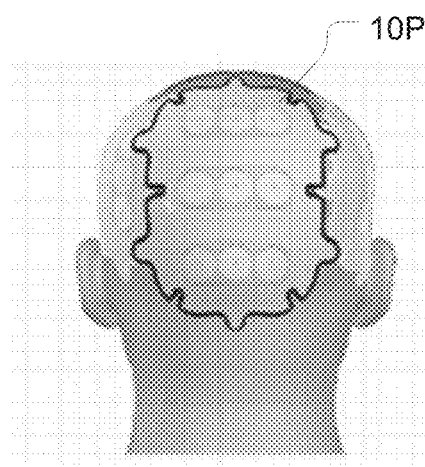
Figure 2C:
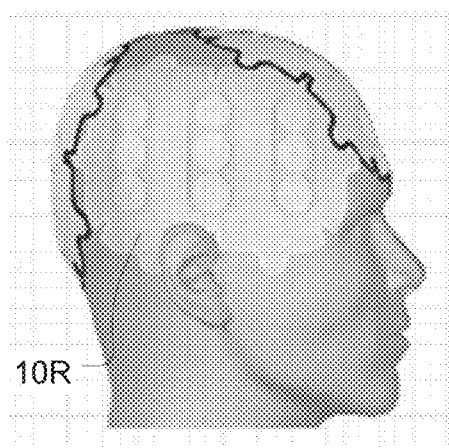
Figure 2D:
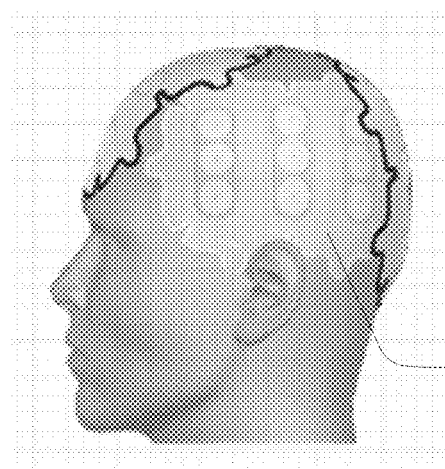

An example that uses numeric values will be helpful to illustrate this point. Assume that the prior art Optune® system depicted in FIG. 1 is being used to treat a glioblastoma in a subject's head using TTFields at 200 kHz. FIGS. 2A-2D depict the Optune® transducer arrays that are used to apply the treatment to the subject's head. Each of these transducer arrays includes nine round electrode elements that have a diameter of 2 cm (i.e., a radius of 1 cm). The total area of all the electrode elements within any given transducer array is therefore 9×3.14×1$^2$=28 cm$^2$.

Let us further assume that the output current of the prior art Optune system is 2 A. As explained above, during some intervals of time an AC voltage is applied only between arrays 10L and 10R, which induces an electric field in the subject's head with field lines that run, on average, from left to right (i.e., the direction of the dashed lines in FIG. 3A); and during other intervals of time an AC voltage is applied only between arrays 10A and 10P, which induces an electric field in the subject's head with field lines that run, on average, from front to back (i.e., the direction of the dashed lines in FIG. 3B). During the former intervals, the current density at each of the transducer arrays 10L and 10R will be 2 A÷28 cm$^2$=71 mA/cm$^2$. And during the latter intervals, the current density at each of the transducer arrays 10L and 10R will be 2 A÷28 cm$^2$=71 mA/cm$^2$. (Note that in reality, the electric field lines will not be straight. But straight dashed lines are nevertheless used in FIGS. 3A/B and 5A/B to represent the general direction of the field lines.)

Now let us assume that the threshold at which electrosensation starts to occur for a particular subject (referred to hereinafter as "subject #1") at a particular frequency is 60 mA/cm$^2$. Because the current density at each of the transducer arrays in this example is 71 mA/cm$^2$ (i.e., higher than the threshold for subject #1), subject #1 will experience electrosensation. One approach for ameliorating this situation would be to reduce the current e.g., to 1.5 A, which would reduce the current density to 1.5 A÷28 cm$^{2=54}$ mA/cm$^2$, which is below the electrosensation threshold for subject #1. But this approach is sub-optimal because lower currents typically reduce the efficacy of the treatment.

Figure 4:
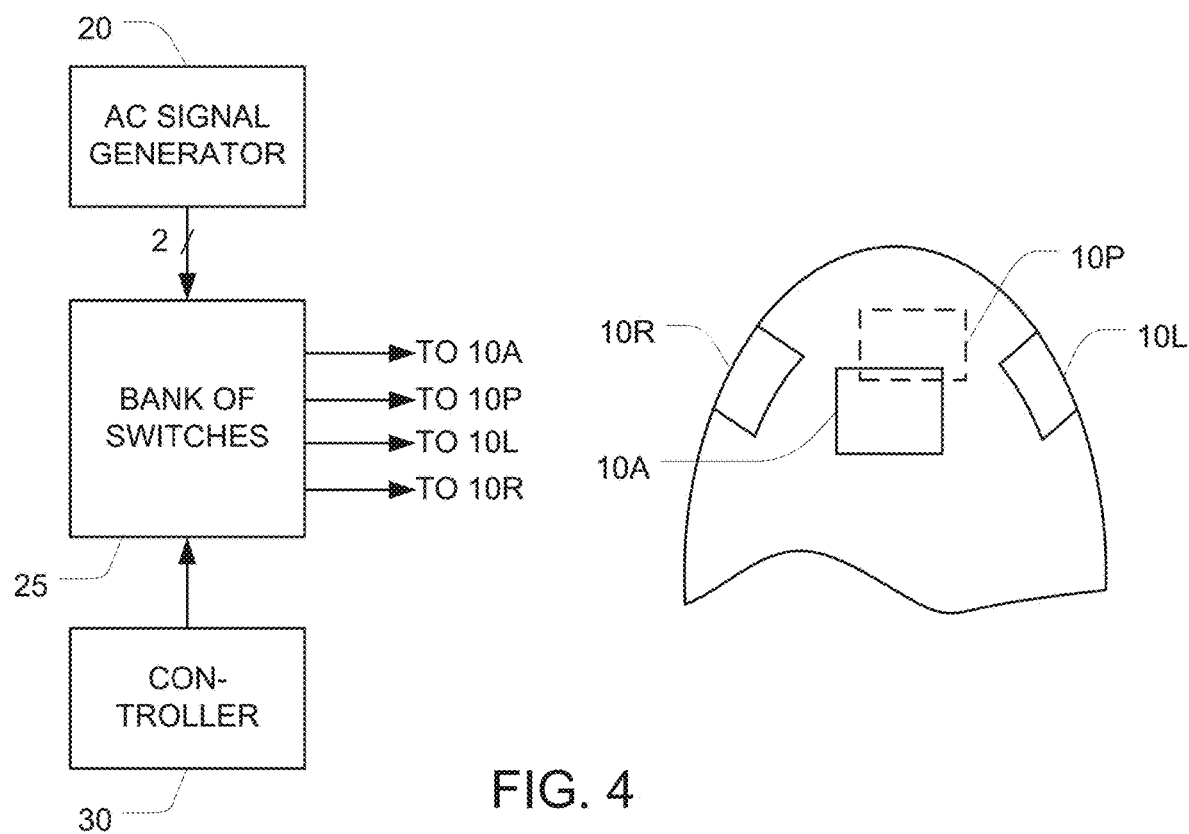
FIG. 4 is a block diagram of an embodiment that applies one phase of an AC signal to two of the transducer arrays simultaneously, and applies the other phase of the AC signal to the other two transducer arrays simultaneously.

FIG. 4 is a block diagram of an embodiment that uses a different approach for reducing the current density at each of the transducer arrays that does not reduce the overall current. The transducer arrays 10 themselves in this embodiment are similar to the transducer arrays 10 described above. But the AC voltages are applied to those transducer arrays 10 in a different pattern, as described immediately below.

In this FIG. 4 embodiment, an AC signal generator 20 generates an AC output signal that has two phases, each of which is input to a bank of switches 25. A variety of approaches for implementing the bank of switches 25 will be apparent to persons skilled in the relevant arts (including but not limited to wiring four SPST solid state relays between the first-phase input and each of the four outputs, respectively, plus an additional four SPST solid state relays between the second-phase input and each of the four outputs, respectively). The path that the AC output signal takes when traveling through the bank of switches 25 is controlled by signals that originate in a controller 30. The bank of switches 25 (operating in response to commands from the controller 30) is configured to route one phase of the AC output signal to two of the transducer arrays 10 simultaneously, and to route the other phase of the AC output signal to the other two transducer arrays 10 simultaneously.

For example, the bank of switches 25 could be commanded to route one phase of the AC output signal to both the anterior and left transducer arrays 10A, 10L, and to route the other phase of the AC signal to both the posterior and right arrays 10P, 10R. When the bank of switches 25 is configured in this manner, these voltages will induce an electric field in the subject's head with field lines that run, on average, diagonally (i.e., the direction of the dashed lines in FIG. 5A). The bank of switches 25 could also be commanded to route one phase of the AC output signal to both the posterior and left transducer arrays 10P, 10L, and to route the other phase of the AC signal to both the anterior and right arrays 10A, 10R. When the bank of switches 25 is configured in this manner, these voltages will induce an electric field in the subject's head with field lines that run, on average, diagonally (i.e., the direction of the dashed lines in FIG. 5B).

Let us now analyze what happens when the FIG. 4 embodiment is used to energize the transducer arrays on subject #1's head using the same output current as the original example (i.e., 2 A), but when each phase of the AC output signal is routed to two of the transducer arrays 10 simultaneously. As explained above, the total area of all the electrode elements within any given transducer array is 28 cm$^2$. But because each phase of the AC output signal is routed to two transducer arrays 10 simultaneously, the same 2 A of current is now spread out over 2×28 cm$^2$=56 cm$^2$. The current density at each of the transducer arrays 10 will therefore be 2 A÷56 cm$^2$=36 mA/cm$^2$, which is below the 60 mA/cm$^2$ electrosensation threshold for subject #1. Indeed, the current in this embodiment could be increased beyond 3 A before reaching subject #1's electrosensation threshold.

As explained above, when each phase of the AC output signal is routed to two transducer arrays 10 simultaneously, the current of the AC output signal is spread out over a significantly larger area. During those times, the spread of the electrode elements that are actively being used at any given instant is significantly wider than the spread of the electrode elements that are active at any given instant in the prior art Optune® system, whether measured in area (as described above) or other units e.g., azimuthal angle or circumference (as described below).

Figure 5B:
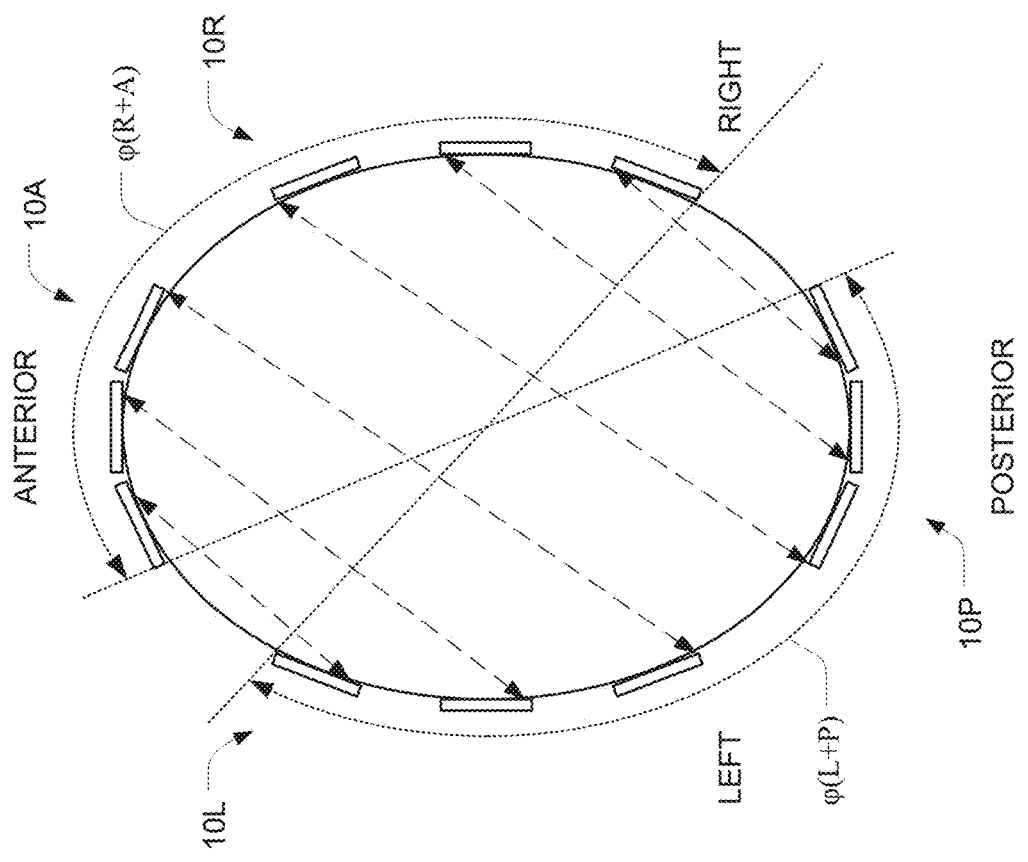
FIG. 5B is a schematic representation of the electric field that is induced when an AC voltage is applied between two transducer arrays (anterior+right) and the remaining two transducer arrays.
Figure 5A:
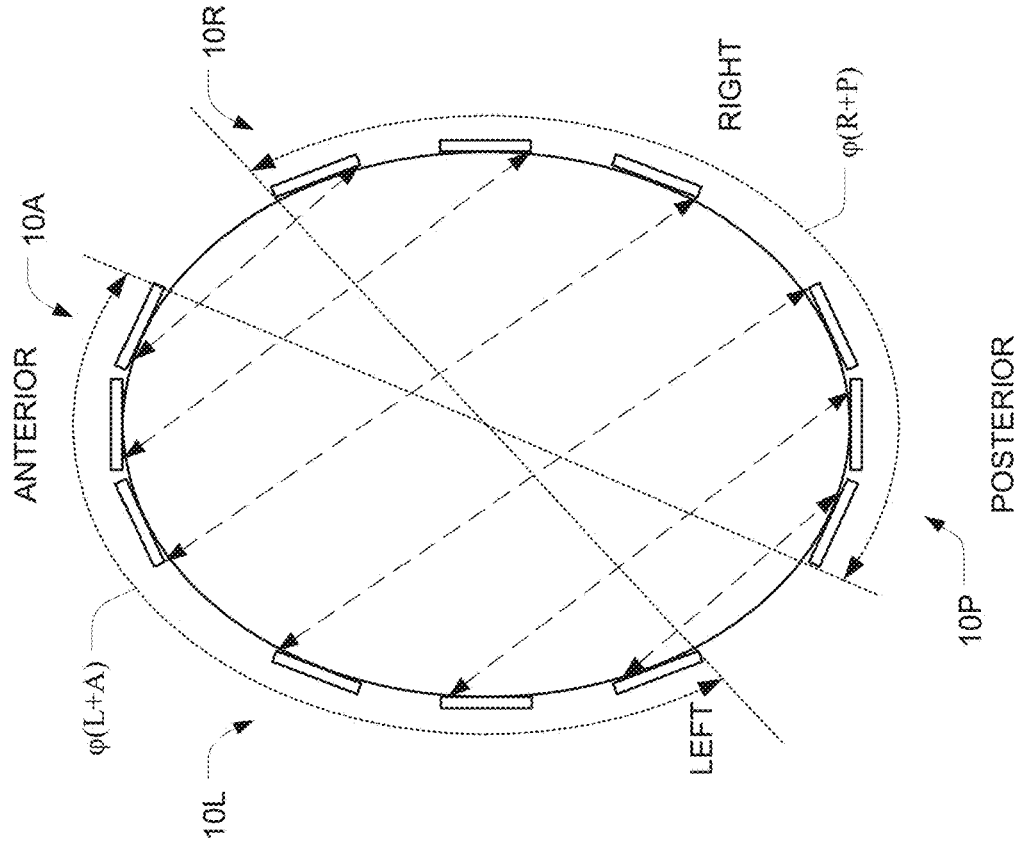
FIG. 5A is a schematic representation of the electric field that is induced when an AC voltage is applied between two transducer arrays (anterior+left) and the remaining two transducer arrays.

FIGS. 5A and 5B are plan views of a subject's head that is being treated with alternating electric fields using four sets of transducer arrays 10A, 10P, 10L, and 10R, which are positioned on the anterior, posterior, left, and right sides of the subject's head, respectively. The dashed lines in FIG. 5A depict a very rough approximation of the electric field lines when one phase of the AC output signal is routed to both the anterior and left transducer arrays 10A, 10L and the other phase of the AC signal is routed to both the posterior and right arrays 10P, 10R. In this situation, the anterior and left transducer arrays collectively operate as a first set of electrode elements, and the posterior and right transducer arrays collectively operate as a second set of electrode elements.

In this situation, an alternating electric field is applied to the subject's head by applying an alternating voltage between (a) the first set of one or more electrode elements 10A, 10L positioned on a first side of the head and (b) the second set of one or more electrode elements 10P, 10R positioned on or in a second side of the head. The first side and the second side are on opposite sides of the longitudinal axis of the head.

Notably, the first set of one or more electrode elements collectively subtend a first azimuthal angle φ(L+A) with respect to the longitudinal axis, and the second set of one or more electrode elements collectively subtend a second azimuthal angle φ(R+P) with respect to the longitudinal axis. (Note that the azimuthal angles referred to herein are measured in polar coordinates in a plane that is perpendicular to the longitudinal axis of the head.)

The first and second azimuthal angles φ(L+A) and φ(R+P) in FIG. 5A are each at least 120°, and in some embodiments each of these angles is at least 135°. These angles are significantly larger than the azimuthal angles collectively subtended by the electrode elements that are active at any given instant in the prior art Optune® system (i.e., φ(L) and φ(R) in FIG. 3A at instants in time when an AC voltage is being applied between the left and right transducer arrays 10L and 10R, or φ(A) and φ(P) in FIG. 3B at instants in time when an AC voltage is being applied between the anterior and posterior transducer arrays 10A and 10P).

A similar situation exists when the circumference of the head that is spanned by the electrode elements within each of the first and second sets of electrode elements is considered. More specifically, the first set of one or more electrode elements collectively span more than 15 cm when measured around the circumference of the head, and the second set of one or more electrode elements collectively span more than 15 cm when measured around the circumference of the head. These distances are significantly larger than the circumference that is collectively spanned by the electrode elements that are active at any given instant in the prior art Optune® system for the left and right transducer arrays 10L and 10R at instants in time when an AC voltage is being applied between those arrays, as depicted in FIG. 3A. In some embodiments, these distances are even larger, and each of the first and second sets of one or more electrode elements collectively span more than 18, 20, or 25 cm when measured around the circumference of the head.

Regardless of whether the span of the electrode elements that are active at any given instant is measured in azimuthal angles or in centimeters along a circumference, the electrode elements cover at least one third of the span that runs from the beginning to the end of the arc φ(L+A), and the electrode elements cover at least one third of the span that runs from the beginning to the end of the arc φ(R+P). (This means that the empty spaces between the electrode elements cover less than two thirds of the span.) In some embodiments, the electrode elements cover at least one half of the span that runs from the beginning to the end of the arc φ(L+A), and the electrode elements cover at least one half of the span that runs from the beginning to the end of the arc φ(R+P). (This means that the empty spaces between the electrode elements cover less than half of the span.) The coverage within those spans could even be higher (e.g., >65%, >80%, or even 100%).

The situation depicted in FIG. 5B is similar to the situation described above in connection with FIG. 5A, except that the dashed lines in FIG. 5B depict a very rough approximation of the electric field lines when one phase of the AC output signal is routed to both the anterior and right transducer arrays 10A, 10R and the other phase of the AC signal is routed to both the posterior and left arrays 10P, 10L. In this situation, the anterior and right transducer arrays collectively operate as the first set of electrode elements, and the posterior and left transducer arrays collectively operate as the second set of electrode elements.

In some circumstances, it can be advantageous to repeatedly alternate the direction of the alternating electric field between the direction depicted in FIG. 5A and the direction depicted in FIG. 5B. One example is when the alternating electric fields are TTFields that are being used to treat a tumor. (This is because the sensitivity of tumors to electric fields is directional.) Another example is when repeatedly shifting the direction of the alternating electric field will increase the coverage of the field within the head based on the geometry of the transducer arrays with respect to the head. The hardware depicted in FIG. 4 can implement this alternation between the FIG. 5A direction and the FIG. 5B direction as described immediately below.

Figure 6:
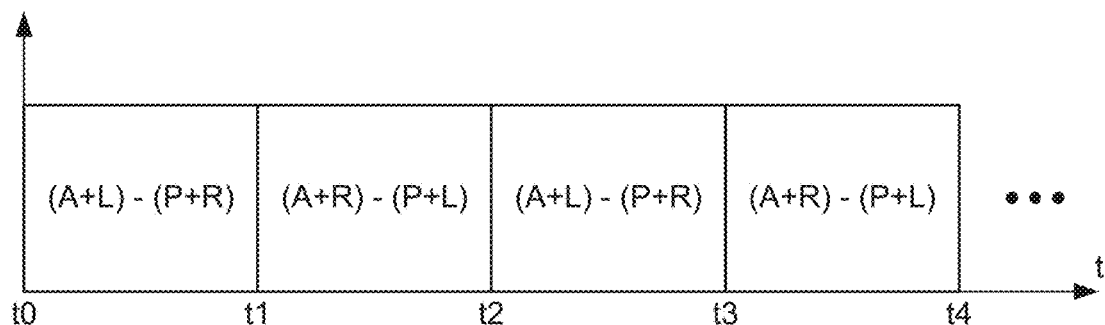
FIG. 6 is a timing diagram of commands for inducing electric fields in the FIG. 5A direction and the FIG. 5B direction at different times.

FIG. 6 depicts the commands that are issued by the controller 30 to implement this alternation. First, between t0 and t1, the controller 30 issues commands to the bank of switches 25 to route one phase of the AC output signal to both the anterior and left transducer arrays 10A, 10L, and to route the other phase of the AC signal to both the posterior and right arrays 10P, 10R, which induces an electric field in the FIG. 5A direction. Then, between t1 and t2, the controller 30 issues commands to the bank of switches 25 to route one phase of the AC output signal to both the posterior and left transducer arrays 10P, 10L, and to route the other phase of the AC signal to both the anterior and right arrays 10AP, 10R, which induces an electric field in the FIG. 5B direction. These two steps are then repeated in an alternating sequence at least 10 times. The duration of each step in the sequence could be anywhere between 10 ms and 12 hours. In some embodiments, the duration of each step in the sequence is between 100 ms and 1000 s, or between 200 ms and 5 s (e.g., 1 s).

The hardware depicted in FIG. 4 can therefore be used to practice a method for applying an alternating electric field to a target region in a subject's body using a first set of one or more electrode elements 10A positioned at a first side of the target region, a second set of one or more electrode elements 10P positioned at a second side of the target region, a third set of one or more electrode elements 10L positioned at a third side of the target region, and a fourth set of one or more electrode elements 10R positioned at a fourth side of the target region. This method comprises (a) applying an alternating voltage at a first frequency between (i) both the first and third sets 10A, 10L of one or more electrode elements and (ii) both the second and fourth 10P, 10R sets of one or more electrode element; and (b) applying an alternating voltage at a second frequency between (i) both the first and fourth sets 10A, 10R of one or more electrode elements and (ii) both the second and third sets 10P, 10L of one or more electrode elements. In this method, (1) the first side and the second side are on opposite sides of the target region; (2) the third side and the fourth side are on opposite sides of the target region; (3) the third side is disposed circumferentially between the first side and the second side; (4) the fourth side is disposed circumferentially between the first side and the second side; and (5) steps (a) and (b) are repeated in an alternating sequence at least ten times.

At some point in time prior to practicing this method, the first, second, third, and fourth sets of one or more electrode elements 10 are all positioned on or in the subject's body. Optionally, the first and second frequencies may each be between 50 kHz and 1 MHz, for example between 100 kHz and 500 kHz or between 100 kHz and 300 kHz. In some embodiments the first and second frequencies may be the same.

This method can be used to apply an alternating electric field to a variety of different body parts, including but not limited to the thorax, abdomen and the head. When the body part is a head, the collective area of the first set of one or more electrode elements may be at least 40 $cm^2$, and the collective area of the second set of one or more electrode elements may be at least 40 $cm^2$.

As noted above, alternating electric fields at certain frequencies (e.g., 100-500 kHz) can be used to treat tumors, and alternating electric fields at typically lower frequencies (e.g., at 50-200 kHz) can increase the permeability of the blood brain barrier (BBB) e.g., to help chemotherapy drugs reach the brain. Combining alternating electric fields at the former frequencies with chemotherapy that is augmented by alternating electric fields at the latter frequencies can therefore be an effective approach to treating a brain tumor. See, e.g., U.S. Pat. No. 10,967,167, which is incorporated herein by reference in its entirety.

The presence and intensity of electrosensation is an intensity-dependent effect with unpleasant electrosensations typically being worse at higher field intensities. The presence and intensity of electrosensation is also a frequency-dependent effect. More specifically, all other things being equal, the unpleasant electrosensations associated with alternating electric fields will typically be worse at the lower frequencies that are effective at increasing the permeability of the BBB (e.g., 100 kHz) as compared to the frequencies that are most effective at treating tumors (e.g., 200 kHz for glioblastoma).

Let us assume that we encounter a subject with a glioblastoma, and we want to treat that subject with 200 kHz TTFields. If we position four transducer arrays on the subject's head as depicted in FIGS. 2A-D, we can treat the glioblastoma using the conventional field-direction switching approach by (a) applying a 200 kHz AC voltage between arrays 10L, 10R for 1 second, which induces an electric field through the tumor with field lines that run, on average, from side to side through the subject's head as shown in FIG. 3A; then (b) applying a 200 kHz AC voltage between the arrays 10A, 10B for 1 second, which induces an electric field through the tumor with field lines that run, on average, from front to back as shown in FIG. 3B; then repeating that two-step sequence (a) and (b) for e.g., 12-16 hours each day.

Let us also assume that we want to use an alternating electric field at 100 kHz to increase the permeability of the same subject's BBB, to increase the efficacy of chemotherapy drugs that are administered e.g., every few weeks. If we continue using the conventional field-direction switching approach described in the previous paragraph and simply lower the frequency of the alternating electric field to 100 kHz, the subject may experience electrosensation. This is because sensitivity to electrosensation is significantly higher at 100 kHz than at 200 kHz.

Figure 7:
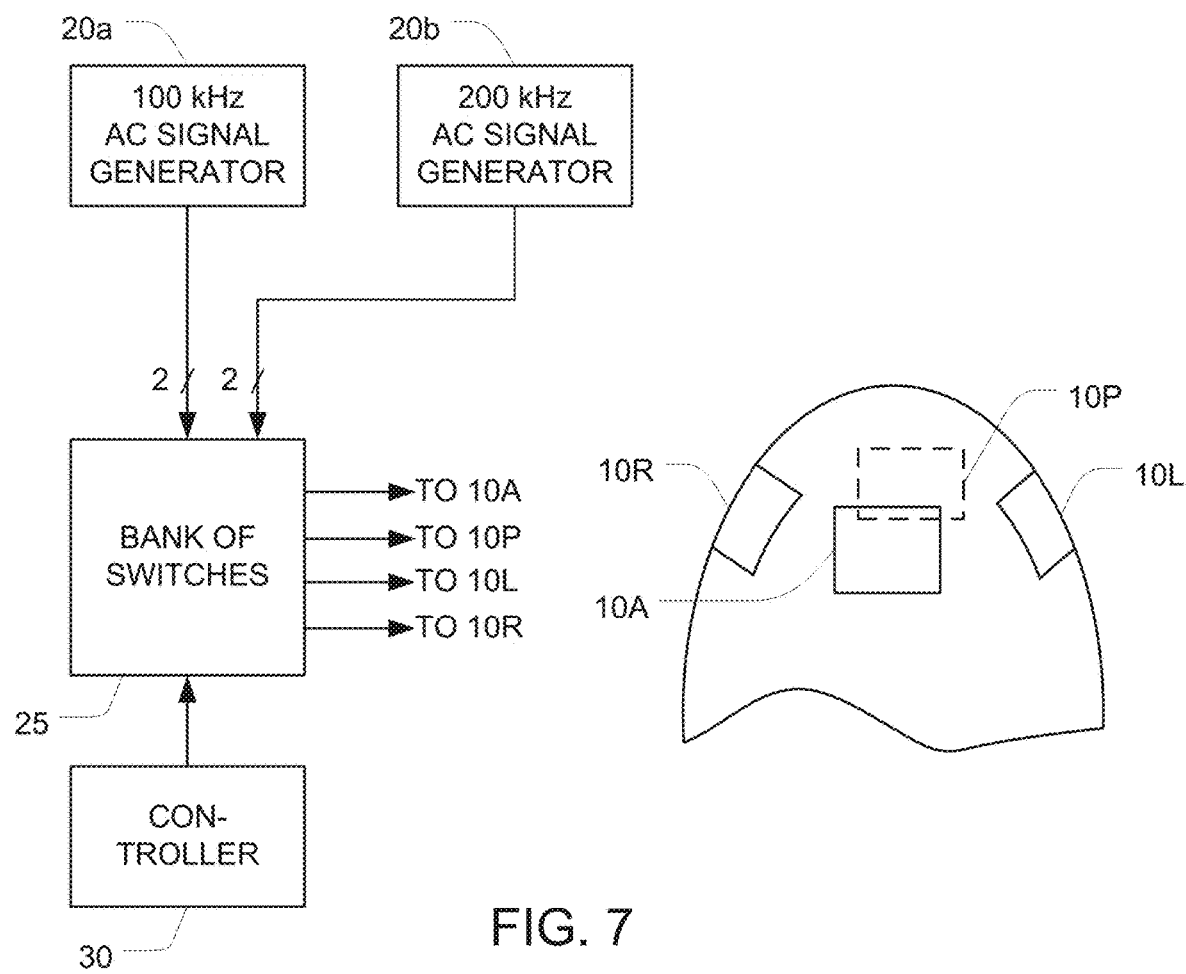
FIG. 7 is a block diagram of another embodiment that applies one phase of an AC signal to two of the transducer arrays simultaneously, and applies the other phase of the AC signal to the other two transducer arrays simultaneously.

FIG. 7 is a block diagram of an embodiment that uses the conventional approach to apply 200 kHz alternating electric fields in the L/R and A/P directions, and also uses the transducer-array-pairing concepts described above in connection with FIG. 4-6 to reduce the current density at each of the transducer arrays while outputting the 100 kHz alternating electric fields. The transducer arrays 10 themselves in this embodiment are similar to the transducer arrays 10 described above. But the AC voltages are applied to those transducer arrays 10 in a different pattern, as described immediately below.

In this FIG. 7 embodiment, the first AC signal generator 20a generates a 100 kHz AC output signal that has two phases, each of which is input to a bank of switches 25. A variety of approaches for implementing the bank of switches 25 will be apparent to persons skilled in the relevant arts (including but not limited to wiring four SPST solid state relays between the first-phase 100 kHz input and each of the four outputs, respectively, plus an additional four SPST solid state relays between the 100 kHz second-phase input and each of the four outputs, respectively, plus an additional four SPST solid state relays between the first-phase 200 kHz input and each of the four outputs, respectively, plus an additional four SPST solid state relays between the 200 kHz second-phase input and each of the four outputs, respectively). The path that the 100 kHz AC output signal takes when traveling through the bank of switches 25 is controlled by signals that originate in a controller 30. The bank of switches 25 (operating in response to commands from the controller 30) is configured to route one phase of the 100 kHz AC output signal to two of the transducer arrays 10 simultaneously, and to route the other phase of the 100 kHz AC output signal to the other two transducer arrays 10 simultaneously.

For example, the bank of switches 25 could be commanded to route one phase of the 100 kHz AC output signal to both the anterior and left transducer arrays 10A, 10L, and to route the other phase of the 100 kHz AC signal to both the posterior and right arrays 10P, 10R. When the bank of switches 25 is configured in this manner, these voltages will induce an electric field in the subject's head with field lines that run, on average, diagonally (i.e., the direction of the dashed lines in FIG. 5A). The bank of switches 25 could also be commanded to route one phase of the 100 kHz AC output signal to both the posterior and left transducer arrays 10P, 10L, and to route the other phase of the 100 kHz AC signal to both the anterior and right arrays 10A, 10R. When the bank of switches 25 is configured in this manner, these voltages will induce an electric field in the subject's head with field lines that run, on average, diagonally (i.e., the direction of the dashed lines in FIG. 5B).

The FIG. 7 embodiment can therefore be used to ameliorate or eliminate electrosensation at the lower 100 kHz frequency using the approaches described above in connection with FIGS. 4-6. More specifically, the electrosensation can be ameliorated or eliminated by configuring the bank of switches 25 (operating in response to commands from the controller 30) to route one phase of the 100 kHz AC output signal to two of the transducer arrays 10 simultaneously, and to route the other phase of the 100 kHz AC output signal to the other two transducer arrays 10 simultaneously. Operating the transducer arrays in pairs in this matter will reduce the current density at each of the transducer arrays, which will eliminate or ameliorate electrosensation at 100 kHz.

In addition to routing the 100 kHz AC signal from signal generator 20a to the four selected outputs as described above, the bank of switches 25 is also configured to route the 200 kHz AC signal from signal generator 20b to the four selected outputs via different paths to (a) apply the 200 kHz AC voltage between arrays 10L, 10R for e.g., 1 second, which induces an electric field through the tumor with field lines that run, on average, from side to side through the subject's head as shown in FIG. 3A; then (b) apply a 200 kHz AC voltage between the arrays 10A, 10P for e.g., 1 second, which induces an electric field through the tumor with field lines that run, on average, from front to back as shown in FIG. 3B; then repeating that two-step sequence (a) and (b) for e.g., 12-16 hours each day. To do this, the controller 30 commands the bank of switches 25 to route one phase of the 200 kHz AC output signal to the left transducer array 10L and to route the other phase of the 200 kHz AC signal to the right array 10R during certain times. When the bank of switches 25 is configured in this manner, these voltages will induce an electric field in the subject's head with field lines that run, on average, left to right (i.e., the direction of the dashed lines in FIG. 3A). During other times, the controller 30 commands the bank of switches 25 to route one phase of the 200 kHz AC output signal to anterior transducer arrays 10A and to route the other phase of the 200 kHz AC signal to the posterior array 10P. When the bank of switches 25 is configured in this manner, these voltages will induce an electric field in the subject's head with field lines that run, on average, front to back (i.e., the direction of the dashed lines in FIG. 3B).

Figure 8A:
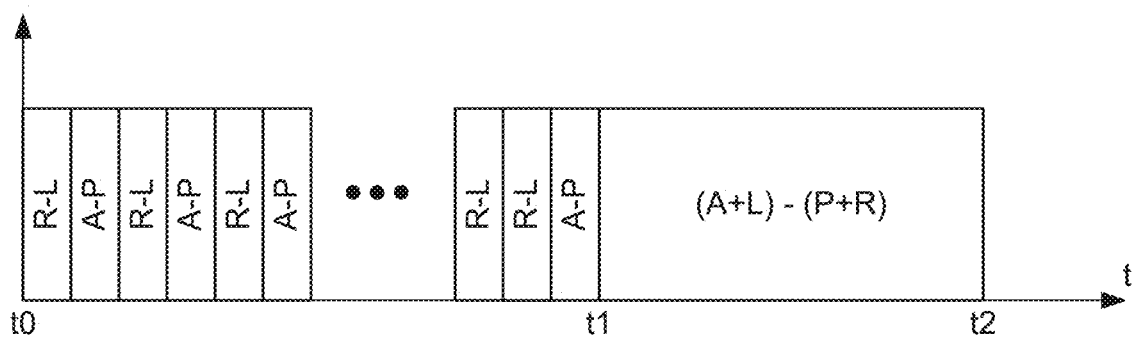
FIG. 8A is a timing diagram of commands for inducing electric fields in the FIG. 3A direction, the FIG. 3B direction, and the FIG. 5A direction at different times.

FIG. 8A depicts one suitable set of commands that may be issued by the controller 30 in FIG. 7 to implement this approach. During the window of time between t0 and t1, the controller 30 (a) issues commands to the bank of switches 25 to route one phase of the first (e.g., 200 kHz) AC output signal the left transducer arrays 10L, and to route the other phase of the first (e.g., 200 kHz) AC signal to the right transducer arrays 10R, which induces an electric field in the FIG. 3A direction for a duration of time (e.g., 1 second); then (b) issues commands to the bank of switches 25 to route one phase of the second (e.g., 200 kHz) AC output signal the anterior transducer arrays 10A, and to route the other phase of the second (e.g., 200 kHz) AC signal to the posterior transducer arrays 10P, which induces an electric field in the FIG. 3B direction for a duration of time (e.g., 1 second). This two-step sequence (a) and (b) is then repeated for e.g., 12-16 hours each day until t1. Then, during the window of time between t1 and t2 (a window that is preferably synchronized in time with the administration of chemotherapy), the controller 30 issues commands to the bank of switches 25 to route one phase of the third (e.g., 100 kHz) AC output signal to both the anterior and left transducer arrays 10A, 10L, and to route the other phase of the third (e.g., 100 kHz) AC signal to both the posterior and right arrays 10P, 10R, which induces an electric field in the FIG. 5A direction.

Figure 8B:
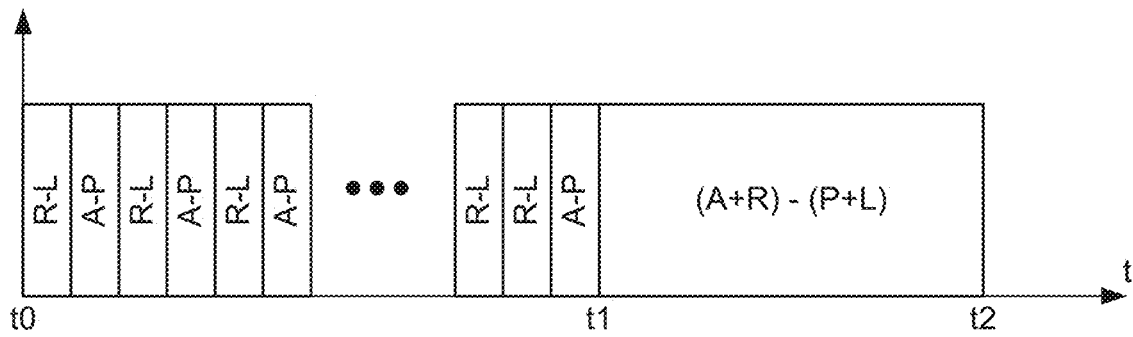
FIG. 8B is a timing diagram of commands for inducing electric fields in the FIG. 3A direction, the FIG. 3B direction, and the FIG. 5B direction at different times.

FIG. 8B depicts another suitable set of commands that may be issued by the controller 30 (in FIG. 4) to implement this approach. The operation of the controller during the window of time between t0 and t1 is the same as described above in connection with FIG. 8A. Then, during the window of time between t1 and t2 (a window that is preferably synchronized in time with the administration of chemotherapy), the controller 30 issues commands to the bank of switches 25 to route one phase of the third (e.g., 100 kHz) AC output signal to both the anterior and right transducer arrays 10A, 10R, and to route the other phase of the third (e.g., 100 kHz) AC signal to both the posterior and left arrays 10P, 10L, which induces an electric field in the FIG. 5B direction.

Returning to FIG. 7, as an alternative to using separate 100 kHz and 200 kHz AC signal generators 20a, 20b as depicted in FIG. 7, a single multi-frequency AC signal generator (not shown) that is capable of operating at either 100 kHz or 200 kHz can be used. In these embodiments, the single multi-frequency AC signal generator should be configured to respond to a frequency-setting command from the controller, so that the correct frequency will arrive at the correct output at the appropriate times, as described above in connection with FIGS. 8A and 8B.

When implementing the approaches described above in connection with either FIG. 8A or 8B, the hardware depicted in FIG. 4 can be used to practice a method for treating a tumor in a target region in the subject's head and delivering a substance across the BBB in the target region. This method comprises applying an alternating voltage at a first frequency (e.g., 200 kHz) between a first set of one or more electrode elements 10A positioned at a first side of the target region and a second set of one or more electrode elements 10P positioned at a second side of the target region, wherein the first side and the second side are on opposite sides of the target region. This method also comprises applying an alternating voltage at a second frequency (e.g., 200 kHz) between a third set of one or more electrode elements 10L positioned at a third side of the target region and a fourth set of one or more electrode elements 10R positioned at a fourth side of the target region, wherein the third side and the fourth side are on opposite sides of the target region, wherein the third side is disposed circumferentially between the first side and the second side, and wherein the fourth side is disposed circumferentially between the first side and the second side. And this method also comprises applying an alternating voltage at a third frequency (e.g., 100 kHz) between (i) both the first and third sets of one or more electrode elements 10A, 10L and (ii) both the second and fourth sets of one or more electrode elements 10P, 10R, wherein the third frequency is lower than the first frequency and the third frequency is lower than the second frequency. The alternating voltage at the first frequency, the alternating voltage at the second frequency, and the alternating voltage at the third frequency are each applied during different intervals of time.

At some point in time prior to practicing this method, the first, second, third, and fourth sets of one or more electrode elements 10 are all positioned at the first, second, third, and fourth sides of the target region, respectively. This may be accomplished, e.g., by positioning the sets of electrode elements on the subject's skin, or implanting them beneath the subject's skin.

In some embodiments of this method, the first frequency (e.g., 200 kHz) is selected so that an electric field that is induced in the target region due to application of the alternating voltage between the first set of one or more electrode elements 10A and the second set of one or more electrode elements 10B will have an anti-mitotic effect. The second frequency (e.g., 200 kHz) is selected so that an electric field that is induced in the target region due to application of the alternating voltage between the third set of one or more electrode elements 10L and the fourth set of one or more electrode elements 10R will have an anti-mitotic effect. And the third frequency (e.g., 100 kHz) is selected so that an electric field that is induced in the target region due to application of the alternating voltage at the third frequency between (a) both the first and third sets of one or more electrode elements 10A, 10L and (b) both the second and fourth sets of one or more electrode elements 10P, 10R will increase permeability of the BBB in the target region.

Optionally, the first frequency and the second frequency are the same. For example, when treating glioblastoma, the first and second frequencies could both be 200 kHz. In some embodiments, the first and second frequencies are each between 50 kHz and 1 MHz, and the third frequency is between 50 kHz and 300 kHz. In some embodiments, the alternating voltage at the third frequency is applied for at least 24 hours.

In some embodiments, the steps of (a) applying the alternating voltage at the first frequency between the first and second sets of one or more electrode elements 10A, 10P and (b) applying the alternating voltage at the second frequency between the third and fourth sets of one or more electrode elements 10L, 10R are repeated in an alternating sequence at least 10,000 times. Assuming that step (a) and step (b) take 1 second each, this corresponds to a total of 20,000 seconds (i.e., about 5.5 hours)

While the discussion above focusses on the context of applying alternating electric fields to a subject's head, similar approaches can be used in other parts of the body, including but not limited to organs within the torso.

Portions of the discussion above focus on applying alternating electric fields to a subject's head in order to increase the permeability of the blood brain barrier. Similar concepts can be applied to other biological barriers that are physically located in other parts of the body (e.g., the intestinal epithelial barrier).

When alternating electric fields are used to treat a tumor, it is preferable to use an electric field whose orientation alternates between different directions, as described above. But when alternating electric fields are used for other purposes (e.g., increasing the permeability of the blood brain barrier or another biological barrier), an electric field whose orientation remains constant can be used.

In some embodiments, each of the electrode elements within each of the transducer arrays 10L, 10R, 10A, and 10B is a capacitively-coupled electrode element (i.e., a conductive plate covered by a layer of a dielectric material on the side that faces the subject's body). But in alternative embodiments, they can be conductive electrode elements (e.g., a flat slab of metal).

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An apparatus for treating a tumor in a target region and promoting delivery of a substance across a biological barrier in the target region, the apparatus comprising:
    at least one signal generator configured to generate an alternating voltage at a first frequency and to generate an alternating voltage at a second frequency, wherein the second frequency is lower than the first frequency;
    a bank of switches having at least one control input, a first output terminal, a second output terminal, a third output terminal, and a fourth output terminal,
        wherein the bank of switches inputs the alternating voltage at the first frequency,
        wherein the bank of switches inputs the alternating voltage at the second frequency,
        wherein the bank of switches is configured to, in response to a first state of the at least one control input, route the alternating voltage at the first frequency so that the alternating voltage at the first frequency appears between the first output terminal and the second output terminal,
        wherein the bank of switches is configured to, in response to a second state of the at least one control input, route the alternating voltage at the first frequency so that the alternating voltage at the first frequency appears between the third output terminal and the fourth output terminal, and
        wherein the bank of switches is configured to, in response to a third state of the at least one control input, route the alternating voltage at the second frequency so that the alternating voltage at the second frequency appears between (a) both the first output terminal and the third output terminal and (b) both the second output terminal and the fourth output terminal; and
    a controller programmed to, at different intervals of times, (i) set the at least one control input to the first state, (ii) set the at least one control input to the second state, and (iii) set the at least one control input to the third state.

2. The apparatus of claim 1, wherein the first frequency is selected to provide an anti-mitotic effect, and
    wherein the second frequency is selected to increase a permeability of a biological barrier.

3. The apparatus of claim 1, wherein the first frequency is between 50 kHz and 1 MHz, and wherein the second frequency is between 50 kHz and 300 kHz.

4. The apparatus of claim 1, wherein the controller is programmed to (i) set the at least one control input to the first state and (ii) set the at least one control input to the second state in an alternating sequence at least 10,000 times.

5. The apparatus of claim 1, wherein the controller is programmed to, after repeating (i) and (ii) at least 10,000 times, set the at least one control input to the third state and subsequently leave the at least one control input in the third state for at least 12 hours.

* * * * *